US012719653B2

(12) United States Patent
Agiwal et al.

(10) Patent No.: US 12,719,653 B2
(45) Date of Patent: Aug. 25, 2026

(54) METHOD AND APPARATUS FOR HANDLING DEACTIVATION OF SIDELINK BWP IN WIRELESS COMMUNICATION SYSTEM

(71) Applicant: SAMSUNG ELECTRONICS CO., LTD., Suwon-si (KR)

(72) Inventors: Anil Agiwal, Suwon-si (KR); Hyunjeong Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 583 days.

(21) Appl. No.: 17/936,723

(22) Filed: Sep. 29, 2022

(65) Prior Publication Data

US 2023/0099561 A1 Mar. 30, 2023

(30) Foreign Application Priority Data

Sep. 29, 2021 (KR) ........................ 10-2021-0129224

(51) Int. Cl.
*H04L 5/00* (2006.01)
*H04W 72/20* (2023.01)
*H04W 72/543* (2023.01)

(52) U.S. Cl.
CPC ........... *H04L 5/0098* (2013.01); *H04W 72/20* (2023.01); *H04W 72/543* (2023.01)

(58) Field of Classification Search
CPC .... H04L 5/0098; H04W 72/20; H04W 72/543
USPC .......................................................... 370/330
See application file for complete search history.

(56) References Cited

U.S. PATENT DOCUMENTS

| | | | | |
|---|---|---|---|---|
| 2020/0229198 | A1* | 7/2020 | Kung | H04W 72/23 |
| 2020/0259627 | A1* | 8/2020 | Loehr | H04W 72/56 |
| 2020/0351067 | A1 | 11/2020 | Hui et al. | |
| 2020/0396703 | A1* | 12/2020 | Luo | H04W 74/0833 |
| 2021/0274545 | A1 | 9/2021 | Adjakple et al. | |
| 2021/0306880 | A1 | 9/2021 | Jung et al. | |

(Continued)

FOREIGN PATENT DOCUMENTS

| | | | |
|---|---|---|---|
| EP | 3703300 | A1 | 9/2020 |
| KR | 10-2019-0116806 | A | 10/2019 |

(Continued)

OTHER PUBLICATIONS

International Search Report and Written Opinion of the International Searching Authority dated Dec. 27, 2022, in connection with International Application No. PCT/KR2022/014635, 9 pages.

(Continued)

*Primary Examiner* — Asad M Nawaz
*Assistant Examiner* — Hugh Mark Ashley

(57) ABSTRACT

The disclosure relates to a 5G or 6G communication system for supporting a higher data transmission rate. Provided is a method performed by a terminal in a wireless communication system, the method comprising: changing an active uplink (UL) bandwidth part (BWP) in a carrier of a cell, from a first UL BWP to a second UL BWP, in case that a subcarrier spacing of the second UL BWP is different than a subcarrier spacing of a sidelink (SL) BWP in the carrier, deactivating the SL BWP, and canceling a triggered sidelink scheduling request procedure.

8 Claims, 6 Drawing Sheets

(56) References Cited

U.S. PATENT DOCUMENTS

| | | | | |
|---|---|---|---|---|
| 2022/0295511 | A1* | 9/2022 | Han | H04W 72/1263 |
| 2022/0408451 | A1* | 12/2022 | Hosseini | H04W 72/56 |
| 2023/0362851 | A1* | 11/2023 | Yang | H04W 56/0015 |

FOREIGN PATENT DOCUMENTS

| | | | |
|---|---|---|---|
| WO | 2021003645 | A1 | 1/2021 |
| WO | 2021109346 | A1 | 6/2021 |

OTHER PUBLICATIONS

Supplementary European Search Report dated No. 26, 2024, in connection with European Patent Application No. 22876886.7, 12 pages.

LG Electronics, "Discussion on resource allocation for NR sidelink Mode 1," R1-1908901, 3GPP TSG RAN WG1 #98 Meeting, Prague, Aug. 26-30, 2019, 8 pages.

Vivo, "Physical layer structure for NR sidelink," R1-1904072, 3GPP TSG RAN WG1 #bis Meeting, Xian, China, Apr. 8-12, 2019, 13 pages.

* cited by examiner

METHOD AND APPARATUS FOR HANDLING DEACTIVATION OF SIDELINK BWP IN WIRELESS COMMUNICATION SYSTEM

CROSS-REFERENCE TO RELATED APPLICATION

This application is based on and claims priority under 35 U.S.C. § 119 to Korean Patent Application No. 10-2021-0129224, filed on Sep. 29, 2021, in the Korean Intellectual Property Office, the disclosure of which is incorporated by reference herein in its entirety.

BACKGROUND

1. Field

The disclosure relates to a method and apparatus for performing communication in a wireless communication system, and more particularly, to a method and apparatus for handling deactivation of sidelink bandwidth part (BWP).

2. Description of Related Art

Fifth generation (5G) mobile communication technologies define broad frequency bands such that high transmission rates and new services are possible, and can be implemented not only in "sub 6 GHz" bands such as 3.5 GHz, but also in "above 6 GHz" bands referred to as mmWave including 28 GHz and 39 GHz. In addition, it has been considered to implement 6G mobile communication technologies (referred to as beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP, new channel coding methods such as a low density parity check (LDPC) code for large amount of data transmission and a polar code for highly; reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR UE power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). TI also has been ongoing standardization in system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as full dimensional MIMO (FD-MIMO), array antennas and large-scale antennas, metamaterial-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

SUMMARY

Aspects of the disclosure are to address at least the above-mentioned problems and/or disadvantages and to provide at least the advantages described below. Accordingly, an aspect of the disclosure is to provide a communication method and system for converging a 5G communication system for supporting higher data rates beyond a 4G communication system.

Before undertaking the DETAILED DESCRIPTION below, it may be advantageous to set forth definitions of certain words and phrases used throughout this patent document: the terms “include” and “comprise,” as well as derivatives thereof, mean inclusion without limitation; the term “or,” is inclusive, meaning and/or; the phrases “associated with” and “associated therewith,” as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term “controller” means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms “application” and “program” refer to one or more computer programs, software components, sets of instructions, procedures, functions, objects, classes, instances, related data, or a portion thereof adapted for implementation in a suitable computer readable program code. The phrase “computer readable program code” includes any type of computer code, including source code, object code, and executable code. The phrase “computer readable medium” includes any type of medium capable of being accessed by a computer, such as read only memory (ROM), random access memory (RAM), a hard disk drive, a compact disc (CD), a digital video disc (DVD), or any other type of memory. A “non-transitory” computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

Figure 1:
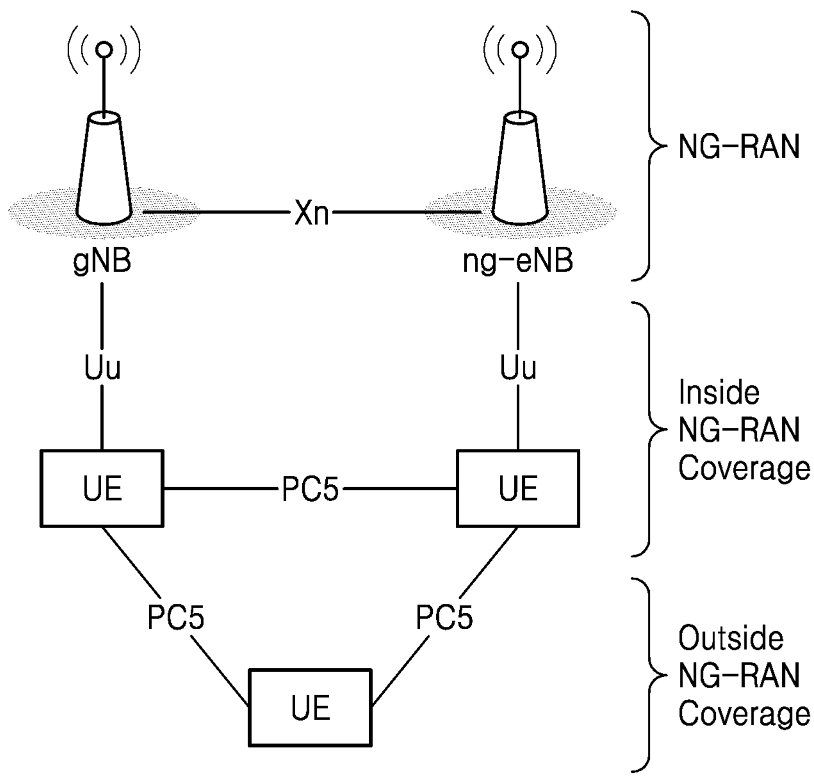
FIG. 1 illustrates 4G and 5G wireless communication system supporting vehicular communication services.

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the attached drawings.

When describing the embodiments, descriptions about technologies that are well known in the art to which the disclosure belongs and are not directly related to the disclosure are not provided here. By not providing unnecessary descriptions, the concept of the disclosure can be further clearly provided without obscuring it.

For the same reasons, in the attached drawings, some elements may be exaggerated, omitted, or roughly illustrated. Also, the size of each element does not exactly correspond to an actual size of each element. Like reference numerals in the drawings denote like or corresponding elements.

The advantages and features of the disclosure and methods of achieving them will become apparent with reference to embodiments of the disclosure described in detail below with reference to the accompanying drawings. The disclosure may, however, be embodied in many different forms and should not be construed as limited to embodiments set forth herein; rather these embodiments are provided so that this disclosure will be thorough and complete, and will fully convey the scope of the disclosure only defined by the claims to one of ordinary skill in the art. Throughout the specification, the same elements are denoted by the same reference numerals.

Throughout the disclosure, the expression “at least one of a, b or c” indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block or blocks. The computer program instructions may also be stored in a computer usable or computer-readable memory that may direct the computer or other programmable data processing apparatus to function in a particular manner, such that the instructions stored in the computer usable or computer-readable memory produce an article of manufacture including instruction means that perform the functions specified in the flowchart block or blocks. The computer program instructions may also be loaded onto the computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit," as used in the present embodiment of the disclosure refers to a software or hardware component, such as field-programmable gate array (FPGA) or application-specific integrated circuit (ASIC), which performs certain tasks. However, the term "unit" does not mean to be limited to software or hardware. A "unit" may be configured to be in an addressable storage medium or configured to operate one or more processors. Therefore, according to some embodiments of the disclosure, a "unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and "units" may be combined into fewer components and "units" or may be further separated into additional components and "units." Further, the components and "units" may be implemented to operate one or more central processing units (CPUs) in a device or a secure multimedia card.

Also, according to some embodiments of the disclosure, a "unit" may include one or more processors.

Hereinafter, operation principles of the disclosure will be described in detail with reference to accompanying drawings. In the following descriptions, well-known functions or configurations are not described in detail because they would obscure the disclosure with unnecessary details. The terms used in the specification are defined in consideration of functions used in the disclosure and can be changed according to the intent or commonly used methods of users or operators. Accordingly, definitions of the terms are understood based on the entire descriptions of the present specification. In the following description, the term "base station" refers to an entity for allocating resources to a user equipment (UE) and may be used interchangeably with at least one of a gNode B, an eNode B, a node B, a base station (BS), a radio access unit, a base station controller (BSC), or a node over a network. The term "terminal" may be used interchangeably with a user equipment (UE), a mobile station (MS), a cellular phone, a smartphone, a computer, or a multimedia system capable of performing communication functions. Herein, an uplink (UL) refers to a radio link from a UE to an eNB. However, the disclosure is not limited to the aforementioned examples.

Hereinafter, the disclosure relates to a technology by which a UE may receive broadcasting information from a BS in a wireless communication system. The disclosure relates to a communication technique and system therefor to combine a 5G communication system with an Internet of Things (IoT) technology, the 5G communication system supporting data rates higher than those of a post 4G system. The disclosure is applicable to intelligent services (e.g., smart home, smart building, smart city, smart car or connected car, health care, digital education, retail, security, and safety services) based on 5G communication technology and Internet of things (IoT) technology.

In the following descriptions, terms referring to broadcast information, terms referring to control information, terms related to communication coverage, terms referring to state changes (e.g., events), terms referring to network entities, terms referring to messages, terms referring to components of an apparatus, and the like are illustrated for convenience of descriptions. Accordingly, the disclosure is not limited to terms to be described below, and other terms indicating objects having equal technical meanings may be used.

For convenience of description, the disclosure uses some of terms and names defined in the 3$^{rd}$ generation partnership project (3GPP) long term evolution (LTE) standards. However, the disclosure is not limited to these terms and names and may be equally applied to communication systems conforming to other standards.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), LTE-advanced (LTE-A), and LTE-pro of the 3GPP, high rate packet data (HRPD) and ultra mobile broadband (UMB) of 3GPP2, 802.16e of the institute of electrical and electronic engineers (IEEE), or the like.

As a representative example of the broadband wireless communication system, the LTE system has adopted an orthogonal frequency division multiplexing (OFDM) scheme in a downlink (DL) and has adopted a single carrier frequency division multiple access (SC-FDMA) scheme in an UL. The UL refers to a radio link through which a UE (also referred to as a mobile station (MS)) transmits data or a control signal to a BS (e.g., eNB), and the DL refers to a radio link through which a BS transmits data or a control signal to a UE. The above-described multiconnection scheme distinguishes between data or control information of different users by assigning time-frequency resources for the data or control information of the users not to overlap each other, i.e., to achieve orthogonality therebetween.

Post-LTE systems, that is, 5G systems need to simultaneously support services capable of reflecting and satisfying various requirements of users, service providers, etc. Services considered for the 5G systems include enhanced mobile broadband (eMBB), massive machine-type communication (mMTC), ultra-reliability low-latency communication (URLLC) services or the like.

According to some embodiments of the disclosure, the eMBB service may be aimed to provide a more enhanced data rate compared to a data rate supported by LTE, LTE-A, or LTE-Pro. For example, the eMBB service in the 5G communication systems need to provide a peak data rate of 20 gigabits per second (Gbps) for a and provide a peak data rate of 10 Gbps for a UL in view of a single base station. Simultaneously, the 5G communication is required to provide an increased user-perceived data rate of a UE. To satisfy these requirements, the 5G communication systems requires various enhanced transmission/reception technologies including enhanced multiple-input and multiple-output (MIMO). The data rate required for the 5G communication systems may be satisfied by using a frequency bandwidth wider than 20 megahertz (MHz) in a frequency band of 3 to 6 GHz or over 6 GHz compared to LTE systems currently using a transmission bandwidth in a 2 GHz band.

At the same time, the mMTC service is considered for the 5G communication systems to support application services such as Iot. The mMTC service may be required to, for example, support massive user access within a cell, enhance UE coverage, increase battery time, and reduce user charges, to efficiently provide the IoT service. The IoT service provides a communication function by using a variety of sensors attached to various devices, and thus needs to support a large number of UEs within a cell (e.g., 1,000,000 UEs/$km^2$). In addition, because UEs supporting mMTC may be located in a shadow zone, e.g., a basement of a building, due to service characteristics, the mMTC service may require a wider coverage compared to other services provided by the 5G communication systems. The UEs supporting mMTC need to be low-priced and are not able to frequently replace batteries and thus require a very long battery life-time, e.g., 10 to 15 years.

Lastly, the URLLC service is a mission-critical cellular-based wireless communication service and may be used for remote control of robots or machinery, industrial automation, unmanned aerial vehicles, remote healthcare, emergency alert, etc., and URLLC communication may have to provide a very low latency (e.g., ultra-low latency) and a very high reliability (e.g., ultra-reliability). For example, the URLLC service needs to satisfy an air interface latency smaller than 0.5 millisecond (ms) and, at the same time, may require a packet error rate equal to or smaller than $10^{-5}$. Therefore, for the URLLC service, the 5G communication systems need to provide a smaller transmit time interval (TTI) compared to other services and, at the same time, may be required to broadly allocate resources in a frequency band. However, mMTC, URLLC, and eMBB described above are only examples of different service types, and thus service types to which embodiments of the disclosure are applied are not limited thereto.

The above-described services considered in the 5G communication systems should be provided in a converged manner based on one framework. That is, for efficient resource management and control, respective services may be integrated, controlled, and transmitted as one system rather than the services operate independently.

Also, although embodiments of the disclosure will be described below by using an LTE, LTE-A, LTE Pro, or NR system as an example, the embodiments of the disclosure may also be applied to other communication systems having similar technical backgrounds or channel forms. Also, the embodiments of the disclosure may also be applied to other communication systems through some modifications without departing from the scope of the disclosure by the judgment of those of ordinary skill in the art.

In the recent years, several broadband wireless technologies have been developed to meet the growing number of broadband subscribers and to provide more and better applications and services. The 2G wireless communication system has been developed to provide voice services while ensuring the mobility of users. The 3G wireless communication system supports not only the voice service but also data service. In recent years, the 4G wireless communication system has been developed to provide high-speed data service. However, currently, the 4G wireless communication system suffers from lack of resources to meet the growing demand for high speed data services. So, the 5G wireless communication system (also referred as next generation radio or NR) is being developed to meet the growing demand for high speed data services, support ultra-reliability and low latency applications.

The 5G wireless communication system supports not only lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive MIMO, FD-MIMO, array antenna, an analog beam forming, large scale antenna techniques are being considered in the design of the 5G wireless communication system. In addition, the 5G wireless communication system is expected to address different use cases having quite different requirements in terms of data rate, latency, reliability, mobility etc. However, it is expected that the design of the air-interface of the 5G wireless communication system would be flexible enough to serve the UEs having quite different capabilities depending on the use case and market segment the UE cater service to the end customer. Few example use cases the 5G wireless communication system wireless system is expected to address is eMBB, m-MTC, URLL etc. The eMBB requirements like tens of Gbps data rate, low latency, high mobility so on and so forth address the market segment representing the conventional wireless broadband subscribers needing Internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enabler for autonomous cars.

In the 5G wireless communication system operating in higher frequency (mmWave) bands, UE and gNB communicates with each other using Beamforming. Beamforming techniques are used to mitigate the propagation path losses and to increase the propagation distance for communication at higher frequency band. Beamforming enhances the transmission and reception performance using a high-gain antenna. Beamforming can be classified into transmission (TX) beamforming performed in a transmitting end and reception (RX) beamforming performed in a receiving end. In general, the TX beamforming, increases directivity by allowing an area in which propagation reaches to be densely located in a specific direction by using a plurality of antennas.

In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal.

By using beamforming technique, a transmitter can make plurality of transmit beam patterns of different directions.

Each of these transmit beam patterns can be also referred as TX beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming. A receiver can also make plurality of RX beam patterns of different directions. Each of these receive patterns can be also referred as RX beam.

The 5G wireless communication system, supports standalone mode of operation as well dual connectivity (DC). In DC, a multiple Rx/Tx UE may be configured to utilize resources provided by two different nodes (or NBs) connected via non-ideal backhaul. One node acts as the master node (MN) and the other as the secondary node (SN). The MN and SN are connected via a network interface and at least the MN is connected to the core network. NR also supports Multi-RAT dual connectivity (MR-DC) operation whereby a UE in RRC_CONNECTED is configured to utilize radio resources provided by two distinct schedulers, located in two different nodes connected via a non-ideal backhaul and providing either E-UTRA (i.e., if the node is an ng-eNB) or NR access (i.e., if the node is a gNB).

In NR for a UE in RRC_CONNECTED not configured with CA/DC there is only one serving cell comprising of the primary cell. For a UE in RRC_CONNECTED configured with CA/DC the term 'serving cells' is used to denote the set of cells comprising of the special Cell(s) and all secondary cells. In NR, the term master cell group (MCG) refers to a group of serving cells associated with the master node, comprising of the PCell and optionally one or more SCells. In NR, the term secondary cell group (SCG) refers to a group of serving cells associated with the secondary node, comprising of the PSCell and optionally one or more SCells. In NR, PCell (primary cell) refers to a serving cell in MCG, operating on the primary frequency, in which the LTE either performs the initial connection establishment procedure or initiates the connection re-establishment procedure. In Na for a UE configured with CA, Scell is a cell providing additional radio resources on top of special cell. Primary SCG Cell (PSCell) refers to a serving cell in SCG in which the UE performs random access when performing the reconfiguration with sync procedure. For dual connectivity operation the term SpCell (i.e., special cell) refers to the PCell of the MCG or the PSCell of the SCG, otherwise the term special cell refers to the PCell.

In the 5G wireless communication system, physical downlink control channel (PDCCH) is used to schedule DL transmissions on PDSCH and UL transmissions on PUSCH, where the downlink control information (DCI) on PDCCH includes: downlink assignments containing at least modulation and coding format, resource allocation, and hybrid-ARQ information related to DL-SCH; uplink scheduling grants containing at least modulation and coding format, resource allocation, and hybrid-ARQ information related to UL-SCH. In addition to scheduling, PDCCH can be used to for: activation and deactivation of configured PUSCH transmission with configured grant; activation and deactivation of PDSCH semi-persistent transmission; notifying one or more UEs of the slot format; notifying one or more UEs of the PRB(s) and OFDM symbols) where the UE may assume no transmission is intended for the UE; Transmission of TPC commands for PUCCH and PUSCH; transmission of one or more TPC commands for SRS transmissions by one or more UEs; switching a UE's active bandwidth part; Initiating a random access procedure.

A UE monitors a set of PDCCH candidates in the configured monitoring occasions in one or more configured control resource sets (CORESETs) according to the corresponding search space configurations. A CORESET consists of a set of PRBs with a time duration of 1 to 3 OFDM symbols. The resource units resource element groups (REGO and control channel elements (CCEs) are defined within a CORESET with each CCE including a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own DMRS. QPSK modulation is used for PDCCH.

In the 5G wireless communication system, a list of search space configurations are signaled by GNB for each configured BWP wherein each search configuration is uniquely identified by an identifier. Identifier of search space configuration to be used for specific purpose such as paging reception, SI reception, random access response reception is explicitly signaled by gNB. In NR, search space configuration comprises of parameters Monitoring-periodicity-PDCCH-slot, Monitoring-offset-PDCCH-slot, Monitoring-symbols-PDCCH-within-slot and duration. A UE determines PDCCH monitoring occasion(s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots "x" to x+duration where the slot with number "x" in a radio frame with number "y" satisfies the equation as given by:

$$(y^*(\text{number of slots in a radio frame})+x-\text{Monitoring-offset-PDCCH-slot}) \bmod (\text{Monitoring-periodicity-PDCCH-slot})=0.$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space. search space configuration includes the identifier of coreset configuration associated with it. A list of coreset configurations are signaled by (NB for each configured BWP wherein each coreset configuration is uniquely identified by an identifier. Note that each radio frame is of 10 ms duration. Radio frame is identified by a radio frame number or system frame number. Each radio frame comprises of several slots wherein the number of slots in a radio frame and duration of slots depends on sub carrier spacing. The number of slots in a radio frame and duration of slots depend radio frame for each supported SCS is pre-defined in NR. Each coreset configuration is associated with a list of TCI (Transmission configuration indicator) states. One DL RS ID (SSB or CSI RS) is configured per TCI state. The list of TCI states corresponding to a coreset configuration is signaled by gNB via RRC signaling. One of the TCI state in TCI state list is activated and indicated to a UE by a gNB. TCI state indicates the DL TX beam (DL TX beam is QCLed with SSB/CSI RS of TCI state) used by GNB for transmission of PDCCH in the PDCCH monitoring occasions of a search space.

In the 5G wireless communication system bandwidth adaptation (BA) is supported. With BA, the receive and transmit bandwidth of a UE need not be as large as the bandwidth of the cell and can be adjusted: the width can be ordered to change (e.g., to shrink during period of low activity to save power); the location can move in the frequency domain (e.g., to increase scheduling flexibility); and the subcarrier spacing can be ordered to change (e.g., to allow different services). A subset of the total cell bandwidth of a cell is referred to as a Bandwidth Part (BWP). BA is achieved by configuring RRC connected a UE with BWP(s) and telling the UE which of the configured BWPs is currently the active one. When BA is configured, the UE only has to monitor PDCCH on the one active BWP i.e., the UE may not monitor PDCCH on the entire DL frequency of the serving cell.

In RRC connected state, a UE is configured with one or more DL and UL BWPs, for each configured serving cell (i.e., PCell or SCell). For an activated serving cell, there is always one active UL and DL BWP at any point in time. The BWP switching for a serving cell is used to activate an inactive BWP and deactivate an active BWP at a time. The BWP switching is controlled by the PDCCH indicating a downlink assignment or an uplink grant, by the bwp-InactivityTimer, by RRC signaling, or by the MAC entity itself upon initiation of random access procedure. Upon addition of SpCell or activation of an SCell, the DL BWP and UL BWP indicated by firstActiveDownlinkBWP-Id and firstActiveUplinkBWP-Id respectively is active without receiving PDCCH indicating a downlink assignment or an uplink grant. The active BWP for a serving cell is indicated by either RRC or PDCCH. For unpaired spectrum, a DL BWP is paired with a UL BWP, and BWP switching is common for both UL and DL. Upon expiry of BWP inactivity tuner UE switch to the active DL BWP to the default DL BWP or initial DL BWP (if default DL BWP is not configured).

FIG. 1 illustrates 4G and 5G wireless communication system supporting vehicular communication services.

Vehicular communication services, represented by V2X services, can consist of the following four different types: V2V, V2I, V2N and V2P. In the 5G (also referred as NR or new radio) wireless communication system, V2X communication is being enhanced to support enhanced V2X use cases, which are broadly arranged into four use case groups:

1) Vehicles platooning enables the vehicles to dynamically form a platoon travelling together. All the vehicles in the platoon obtain information from the leading vehicle to manage this platoon. This information allows the vehicles to drive closer than normal in a coordinated manner, going to the same direction and travelling together;
2) Extended sensors enables the exchange of raw or processed data gathered through local sensors or live video images among vehicles, road site units, devices of pedestrian and V2X application servers. The vehicles can increase the perception of their environment beyond of what their own sensors can detect and have a broader and holistic view of the local situation. High data rate is one of the hey characteristics;
3) Advanced driving enables semi-automated or full-automated driving. Each vehicle and/or RSU shares its own perception data obtained from its local sensors with vehicles in proximity and that allows vehicles to synchronize and coordinate their trajectories or maneuvers. Each vehicle shares its driving intention with vehicles in proximity too; and.
4) Remote driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

Figure 4:
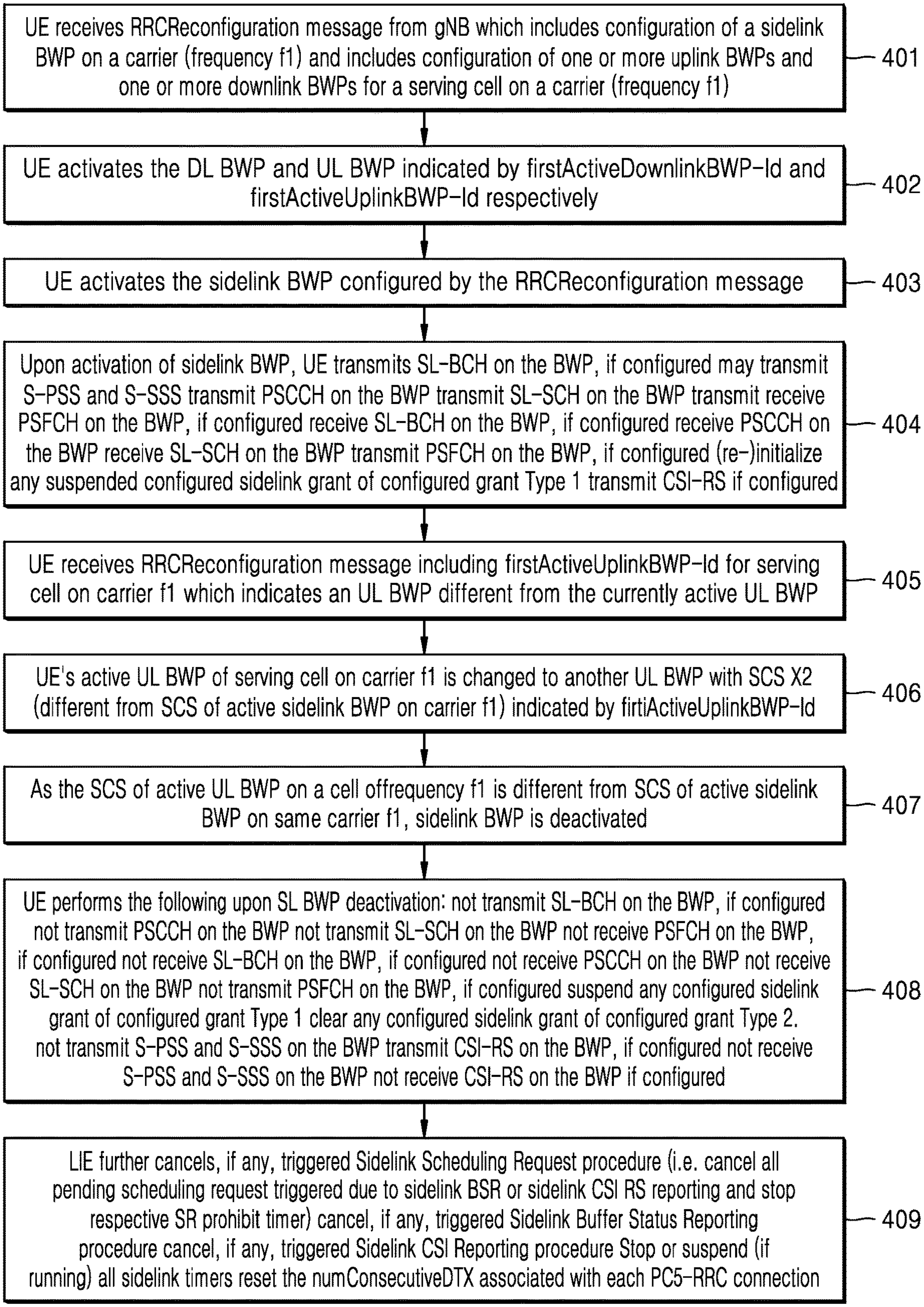
FIG. 4 illustrates an example of UE operation according to some embodiments of the present disclosure.

V2X services can be provided by PC5 interface and/or Uu interface. Support of V2X services via PC5 interface is provided by NR sidelink communication or V2X sidelink communication, which is a mode of communication whereby UEs can communicate with each other directly over the PC5 interface using NR technology or EUTRA technology respectively without traversing any network node. This communication mode is supported when the UE is served by RAN and when the LTE is outside of RAN coverage. Only the UEs authorized to be used for V2X services can perform NR or V2X sidelink communication. The NG-RAN architecture supports the PC5 interface as illustrated in FIG. 4. Sidelink transmission and reception over the PC5 interface are supported when the UE is inside NG-RAN coverage, irrespective of which RRC state the UE is in, and when the UE is outside NG-RAN coverage. Support of V2X services via the PC5 interface can be provided by NR sidelink communication and/or V2X sidelink communication. NR sidelink communication may be used to support other services than V2X services.

NR or V2X sidelink communication can support three types of transmission modes. Unicast transmission, characterized by support of at least one PC5-RRC connection between peer UEs; transmission and reception of control information and user traffic between peer UEs in sidelink; support of sidelink HARQ feedback; support of RLC AM; and support of sidelink RLM for both peer UEs to detect RLF. Groupcast transmission, characterized by: transmission and reception of user traffic among UEs belonging to a group in sidelink; support of sidelink HARQ feedback. Broadcast transmission, characterized by: transmission and reception of user traffic among UEs in sidelink.

The AS protocol stack for the control plane in the PC5 interface consists of RRC, PDCP, RLC and MAC sublayer, and the physical layer. The AS protocol stack for user plane in the PC5 interface consists of SDAP, PDCP, RLC and MAC sublayer, and the physical layer. sidelink radio bearers (LRB) are categorized into two groups: sidelink data radio bearers (SL DRB) for user plane data and sidelink signalling radio bearers (SL SRB) for control plane data. Separate SL SRBs using different SCCHs are configured for PC5-RRC and PC5-S signaling respectively.

The MAC sublayer provides the following services and functions over the interface: radio resource selection; packet filtering; priority handling between uplink and sidelink transmissions for a given UE; sidelink CSI reporting. With LCP restrictions in MAC, only sidelink logical channels belonging to the same destination can be multiplexed into a MAC PDU for every unicast, groupcast and broadcast transmission which is associated to the destination. NG-RAN can also control whether a sidelink logical channel can utilize the resources allocated to a configured sidelink grant Type 1. For packet filtering, a SL-SCH MAC header including portions of both source layer-2 ID and a destination layer-2 ID is added to each MAC PDU as specified in 3GPP standard specification LCID included within a MAC subheader uniquely identifies a logical channel within the scope of the source layer-2 ID and destination Layer-2 ID combination. The following logical channels are used in sidelink:

sidelink control channel (SCCH): a sidelink channel for transmitting control information from one UE to other UE(s);

sidelink traffic channel (STCH): a sidelink channel for transmitting user information from one UE to other UE(s); and sidelink broadcast control channel (SBCCH): a sidelink channel for broadcasting sidelink system information from one UE to other UE(s).

The following connections between logical channels and transport channels exist:

SCCH can be mapped to SL-SCH;

STCH can be mapped to SL-SCH; and

SBCCH can be mapped to SL-BCH.

A sidelink operation involves the following physical layer channels and signals:

physical sidelink control channel (PSCCH) indicates resource and other transmission parameters used by a UE for PSSCH. PSCCH transmission is associated with a DM-RS;

physical sidelink shared channel (PSSCH) transmits the TBs of data themselves, and control information for HARQ procedures and CSI feedback triggers, etc. At least 6 OFDM symbols within a slot are used for PSSCH transmission. PSSCH transmission is associated with a DM-RS and may be associated with a PT-RS;

physical sidelink feedback channel (PSFCH) carries HARQ feedback over the sidelink from a UE which is an intended recipient of a PSSCH transmission to the UE which performed the transmission. PSFCH sequence is transmitted in one PRB repeated over two OFDM symbols near the end of the sidelink resource in a slot;

the sidelink synchronization signal consists of sidelink primary and sidelink secondary synchronization signals (S-PSS, S-SSS), each occupying 2 symbols and 127 subcarriers. Physical sidelink broadcast channel (PSBCH) occupies 9 and 5 symbols for normal and extended CP cases respectively, including the associated DM-RS; and for unicast, channel state information reference signal (CSI-RS) is supported for CSI measurement and reporting in sidelink. A CSI report is carried in a sidelink MAC CE.

The RRC sublayer provides the following services and functions over the PC5 interface:

Transfer of a PC5-RRC message between peer UEs;

Maintenance and release of a PC5-RRC connection between two UEs, and

Detection of sidelink radio link failure for a PC5-RRC connection.

A PC5-RRC connection is a logical connection between two UEs for a pair of source and destination layer-2 IDs which is considered to be established after a corresponding PC5 unicast link is established as specified in TS 23,287. There is one-to-one correspondence between the PC5-RRC connection and the PC5 unicast link. A UE may have multiple PC5-RRC connections with one or more UEs for different pairs of source and destination layer-2 IDs. Separate PC5-RRC procedures and messages are used for a UE to transfer UE capability and sidelink configuration including SLRB configuration to the peer UE. Both peer UEs can exchange their own UE capability and sidelink configuration using separate bi-directional procedures in both sidelink directions. If a UE is not interested in sidelink transmission, if sidelink RLF on the PC5-RRC connection is declared, or if the layer-2 link release procedure is completed as specified in TS 23.287, the UE releases the PC5-RRC connection.

The UE can operate in two modes for resource allocation in sidelink:

* Scheduled resource allocation, characterized by:

** The UE needs to be RRC_CONNECTED in order to transmit data, and

** NG-RAN schedules transmission resources;

* UE autonomous resource selection, characterized by:

** The UE can transmit data when inside NG-RAN coverage, irrespective of which RRC state the UE is in, and when outside NG-RAN coverage, and

** The UE autonomously selects transmission resources from a pool of resources; and.

* For NR sidelink communication, the UE performs sidelink transmissions only on a single carrier.

Scheduled resource allocation: NG-RAN can dynamically allocate resources to the UE via the SL-RNTI on PDCCH(s) for NR sidelink Communication. In addition, NG-RAN can allocate sidelink resources to the UE with two types of configured sidelink grants:

With type 1, RRC directly provides the configured sidelink grant for MR sidelink communication; and With type 2, RRC provides the periodicity of the configured sidelink grant while PDCCH can either signal and activate the configured sidelink grant, or deactivate it. The PDCCH provides the actual grant (i.e., resources) to be used. The PDCCH is addressed to SL-CS-RNTI for NR sidelink communication and SL semi-persistent scheduling V-RNTI for V2X sidelink communication.

For the UE performing NR sidelink communication, there can be more than one configured sidelink grant activated at a time on the carrier configured for sidelink transmission. When beam failure or physical layer problem occurs on MR Uu, the UE can continue using the configured sidelink grant Type 1. During handover, the UE can be provided with configured sidelink grants via handover command, regardless of the type. If provided, the UE activates the configured sidelink grant Type 1 upon reception of the handover command. The UE can send sidelink buffer status report to support scheduler operation in NG-RAN. The sidelink buffer status reports refer to the data that is buffered in for a group of logical channels (LCG) per destination in the UR Eight LCGs are used for reporting of the sidelink buffer status reports. Two formats, which are SL BSR and truncated SL BSR, are used.

UE autonomous resource allocation: the UE autonomously selects sidelink grant from a pool of resources provided by broadcast system information or dedicated signalling while inside NG-RAN coverage or by preconfiguration while outside NG-RAN coverage.

For NR sidelink communication, the pools of resources can be provided for a given validity area where the UE does not need to acquire a new pool of resources while moving within the validity area, at least when this pool is provided by SIB (e.g., reuse valid area of NR SIB). NR SIB validity mechanism is reused to enable validity area for SL resource pool configured via broadcasted system information. The UE is allowed to temporarily use UE autonomous resource selection with random selection for sidelink transmission based on configuration of the exceptional transmission resource pool.

For V2X sidelink transmission, during handover, transmission resource pool configurations including exceptional transmission resource pool for the target cell can be signaled in the handover command to reduce the transmission interruption. In this way, the UE may use the V2X sidelink transmission resource pools of the target cell before the handover is completed as long as either synchronization is performed with the target cell in case eNB is configured as synchronization source or synchronization is performed with GNSS in case GNSS is configured as synchronization source. If the exceptional transmission resource pool is included in the handover command, the UE uses randomly selected resources from the exceptional transmission resource pool, starting from the reception of handover command.

If the UE is configured with scheduled resource allocation in the handover command, the UE continues to use the exceptional transmission resource pool while the timer associated with handover is running. If the UE is configured with autonomous resource selection in the target cell the UE continues to use the exceptional transmission resource pool until the sensing results on the transmission resource pools for autonomous resource selection are available. For exceptional cases (e.g., during RLF, during transition from RRC IDLE to RRC CONNECTED or during change of dedicated V2X sidelink resource pools within a cell), the UE may select resources in the exceptional pool provided in serving cell's SIB21 or in dedicated signalling based on random selection, and uses them temporarily. During cell reselection, the RRC_IDLE UE may use the randomly selected resources from the exceptional transmission resource pool of the reselected cell until the sensing results on the transmission resource pools for autonomous resource selection are available.

A UE is performing SL communication on an active SL BWP in frequency f1 with SCS X1. UE active UL BWP in frequency f1 also has SCS X1. UE's active UL BWP is changed (timer based/DCI based/RRC reconfiguration based) to another UL BWP with SCS X2. SL BWP is deactivated as SCS of active UL BWP on f1 and active SL BWP on f1 is not same. The UE performs the following upon SL BWP deactivation:

* not transmit SL-BCH on the BWP, if configured;
* not transmit PSCCH on the BWP;
* not transmit SL-SCH on the BWP;
* not receive PSFCH on the BWP, if configured.
* not receive SL-BCH on the BWP, if configured;
* not receive PSCCH on the BWP;
* not receive SL-SCH on the MVP;
* not transmit PSFCH on the BWP, if configured;
* suspend any configured sidelink grant of configured grant Type 1; and
* clear any configured sidelink grant of configured grant Type 2.

The issue is how to handle a scheduling request procedure, a sidelink buffer status reporting procedure, a sidelink CSI reporting procedure, a sidelink processes, timers etc., upon SL BWP deactivation, Embodiment 1

1. A UE receives an RRCReconfiguration message from a gNB. The RRCReconfiguration message includes configuration of a sidelink BWP for sidelink communication on a carrier (e.g., frequency f1). The subcarrier spacing of sidelink BWP is X1. X1 can be one of kHz15, kHz30, kHz60, kHz120, kHz240. In an alternate embodiment, X1 can be other other subcarrier spacing such as kHz480, kHz960, etc. The RRCReconfiguration message also includes configuration of one or more uplink MVPs and one or more downlink BWPs for a serving cell on a carrier (e.g., frequency f1). The configuration of serving cell also includes firstActiveUplinkBWP-Id and firstActiveDownlinkBWP-Id. In an embodiment, a serving cell can be PCell. In an alternate embodiment, a serving cell can be SpCell. In an alternate embodiment, serving cell can be SCell.

2. Upon receiving the RRCReconfiguration message, for a serving cell on frequency f1, the UE activates the DL BWP and UL BWP indicated by firstActiveDownlinkBWP-Id and firstActiveUplinkBWP-Id, respectively. The subcarrier spacing of active UL BWP is X1. The UE activates the sidelink BWP configured by the RRCReconfiguration message.

3. Upon activation of sidelink BWP, the UE transmits SL-BCH on the BWP, if configured; may transmit S-PSS and S-SSS, if configured; transmit PSCCH on the BWP; transmit SL-SCH on the BWP; transmit receive PSFCH on the BWP, if configured; receive SL-BCH on the BWP, if configured; receive PSCCH on the BWP; receive SL-SCH on the MVP; transmit PSFCH on the BWP, if configured; (re-)initialize any suspended configured sidelink grant of configured grant Type 1; transmit CSI-RS, if configured; receive CSI-RS, if configured; may receive S-PSS and S-SSS, if configured.

For the sidelink communication using the active sidelink BWP, the UE initializes SBj of the logical channel to zero when the logical channel is established. SBj is maintained for each sidelink logical channel j. For each logical channel j, the UE increments SBj is by the product sPBR×T before every instance of the LCP procedure (LCP procedure as specified in TS 38.321 is applied each time the UE generates SL MAC PDU for transmission in sidelink grant), where T is the time elapsed since SBj was last incremented; if the value of SBj is greater than the sidelink bucket size (i.e., sPBR×sBSD): set SBj to the sidelink bucket size. sPBR is the sidelink prioritized bit rate and sBSD is the sidelink bucket size duration configured by a gNB.

For the sidelink communication, the scheduling request (SR) is used by the UE for requesting SL-SCH resources for new transmission when triggered by the sidelink BSR or the SL-CSI reporting.

A SL-BSR is not triggered if there is no active sidelink BWP. A SL-BSR may be triggered if sidelink BWP is active and if any of the following events occur:

*1> if the MAC entity has been configured with sidelink resource allocation mode 1:

**2> SL data, for a logical channel of a Destination, becomes available to the MAC entity; and either

***3> this SL data belongs to a logical channel with higher priority than the priorities of the logical channels containing available SL data which belong to any LCG belonging to the same Destination; or

***3> none of the logical channels which belong to an LCG belonging to the same Destination contains any available SL data, in which case the SL-BSR is referred below to as "Regular SL-BSR";

**2> UL resources are allocated and number of padding bits remaining after a Padding BSR has been triggered is equal to or larger than the size of the SL-BSR MAC CE plus its subheader, in which case the SL-BSR is referred below to as "Padding SL-BSR";

**2> sl-retxBSR-Timer expires, and at least one of the logical channels which belong to an LCG contains SL data, in which case the SL-BSR is referred below to as "Regular SL-BSR",

**2> sl-periodicBSR-Timer expires, in which case the SL-BSR is referred below to as "Periodic SL-BSR."

*1> else:

**2> Sidelink resource allocation mode 1 is configured by RRC and SL data is available for transmission in the RLC entity or in the PDCP entity, in which case the sidelink BSR is referred below to as "Regular SL-BSR"; or

**2> Sidelink BWP is activated and SL data is available for transmission in the RLC entity or in the PDCP entity, in which case the sidelink BSR is referred below to as "regular SL-BSR";

For Regular SL-BSR, the MAC entity may:

*1> if the SL-BSR is triggered for a logical channel for which logicalChannelSR-DelayTimerApplied with value true is configured by RRC:

**2> start or restart the sl-logicalChannelSR-DelayTimer,

*1> else:

**2> if running, stop the sl-logicalChannelSR-DelayTimer

*1> if the sidelink Buffer Status reporting procedure determines that at least one SL-BSR has been triggered and not cancelled:

**2> if UL-SCH resources are available for a new transmission and the UL-SCH resources can accommodate the SL-BSR MAC CE plus its subheader as a result of logical channel prioritization according to 3GPP standard specification:

***3> instruct the multiplexing and assembly procedure in 3GPP standard specification to generate the SL-BSR MAC CE(s);

***3> start or restart sl-periodicBSR-Timer except when all the generated SL-BSRs are truncated SL-BSRs;

***3> start or restart sl-retxBSR-Timer.

**2> if a regular SL-BSR has been triggered and sl-logicalChannelSR-DelayTimer is not running:

***3> if there is no UL-SCH resource available for a new transmission; or

***3> if UL-SCH resources are available for a new transmission and the UL-SCH resources cannot accommodate the SL-BSR MAC CE plus its subheader as a result of logical channel prioritization according to 3GPP standard specification; or

***3> if the set of Subcarrier Spacing index values in sl-AllowedSCS-List, if configured for the logical channel that triggered the SL-BSR, does not include the Subcarrier Spacing index associated to the UL-SCH resources available for a new transmission; or

***3> if sl-MaxPUSCH-Duration, if configured for the logical channel that triggered the SL-BSR, is smaller than the PUSCH transmission duration associated to the UL-SCH resources available for a new transmission:

****4> trigger a scheduling request

The MAC entity maintains a sl-CSI-ReportTimer for each pair of the source layer-2 ID and the destination layer-2 ID corresponding to a PC5-RRC connection. sl-CSI-ReportTimer is used for a SL-CSI reporting UE to follow the latency requirement signalled from a CSI triggering UE. The value of sl-CSI-ReportTimer is the same as the latency requirement of the SL-CSI reporting insl-LatencyBound-CSI-Report configured by RRC.

The MAC entity may for each pair of the source layer-2 ID and the destination Layer-2 ID corresponding to a PC5-RRC connection which has been established by upper layers:

*1> if the SL-CSI reporting has been triggered by a SCI and not cancelled:

**2> if the sl-CSI-ReportTimer for the triggered SL-CSI reporting is not running:

***3> start the sl-CSI-ReportTimer.

**2> if the sl-CSI-ReportTimer for the triggered SL-CSI reporting expires:

***3> cancel the triggered SL-CSI reporting.

**2> else if the MAC entity has SL resources allocated for new transmission and the SL-SCH resources can accommodate the SL-CSI reporting MAC CE and its subheader as a result of logical channel prioritization:

***3> instruct the multiplexing and assembly procedure to generate a sidelink CSI reporting MAC CE as defined in 3GPP standard specification;

***3> stop the sl-CSI-ReportTimer for the triggered SL-CSI reporting;

***3> cancel the triggered SL-CSI reporting.

**2> else if the MAC entity has been configured with sidelink resource allocation mode 1:

***3> trigger a scheduling request (SR).

As long as at least one SR is pending, the MAC entity in a UE may for each pending SR:

*1> if the MAC entity has no valid PUCCH resource configured for the pending SR:

**2> initiate a random access procedure (see 3GPP standard specification) on the SpCell and cancel the pending SR.

*1> else, for the SR configuration corresponding to the pending SR:

**2> when the MAC entity has an SR transmission occasion on the valid PUCCH resource for SR configured; and

**2> if sr-ProhibitTimer is not running at the time of the SR transmission occasion; and

**2> if the PUCCH resource for the SR transmission occasion does not overlap with a measurement gap:

***3> if the PUCCH resource for the SR transmission occasion overlaps with neither a UL-SCH resource nor an SL-SCH resource; or if the MAC entity is able to perform this SR transmission simultaneously with the transmission of the SL-SCH resource; or

***3> if the MAC entity is configured with lch-basedPrioritization, and the PUCCH resource for the SR transmission occasion does not overlap with the PUSCH duration of an uplink grant received in a random access response or with the PUSCH duration of an uplink grant addressed to temporary C-RNTI or with the PUSCH duration of a MSGA payload, and the PUCCH resource for the SR transmission occasion for the pending SR triggered as specified in 3GPP standard specification overlaps with any other UL-SCH resource(s), and the physical layer can signal the SR on one valid PUCCH resource for SR, and the priority of the logical channel that triggered SR is higher than the priority of the uplink grant(s) for any UL-SCH resource(s) where the uplink grant was not already de-prioritized, and the priority of the uplink grant is determined as specified in 3GPP standard specification; or

***3> if both sl-PrioritizationThres and ul-PrioritizationThres are configured and the PUCCH resource for the SR transmission occasion for the pending SR triggered as specified in 3GPP standard specification overlaps with any UL-SCH resource(s) carrying a MAC, PPV, and the value of the priority of the triggered SR determined as specified in 3GPP standard specification is lower than sl-PrioritizationThres and the value of the highest priority of the logical channel(s) in the MAC PDU is higher than or equal to ul-PrioritizationThres and the MAC PDU is not prioritized by upper layer according to TS 23.287; or

***3> if a SL-SCH resource overlaps with the PUCCH resource for the SR transmission occasion for the pending SR triggered as specified in 3GPP standard specification, and the MAC entity is not able to perform this SR transmission simultaneously with the transmission of the SL-SCH resource, and either transmission on the SL-SCH resource is not prioritized as described in 3GPP standard specification or the priority value of the logical channel that triggered SR is lower than ul-PrioritizationThres, if configured; or

***3> if a SL-SCH resource overlaps with the PUCCH resource for the SR transmission occasion for the pending SR triggered as specified in 3GPP standard specification, and the MAC entity is not able to perform this SR transmission simultaneously with the transmission of the SL-SCH resource, and the priority of the triggered SR determined as specified in 3GPP standard specification is higher than the priority of the MAC PDU determined as specified in 3GPP standard specification for the SL-SCH resource:

****4> consider the SR transmission as a prioritized SR transmission.

****4> consider the other overlapping uplink grant(s), if any, as a de-prioritized uplink grant(s);

****4> if the de-prioritized uplink grant(s) is a configured uplink grant configured with autonomousTx whose PUSCH has already started:

*****5> stop the configuredGrantTimer for the corresponding HARQ process of the de-prioritized uplink grant(s).

****4> if SR_COUNTER<sr-TransMax:

*****5> instruct the physical layer to signal the SR on one valid PUCCH resource for SR;

*****5> if LBT failure indication is not received from lower layers:

******6> increment SR_COUNTER by 1;

******6> start the sr-ProhibitTimer.

*****5> else if lbt-FailureRecoyeryConfig is not configured:

******6> increment SR_COUNTER by 1.

****4> else:

*****5> notify RRC to release PUCCH for all serving cells;

*****5> notify RRC to release SRS for all serving cells;

*****5> clear any configured downlink assignments and uplink grants;

*****5> clear any PUSCH resources for semi-persistent CSI reporting;

*****5> initiate a random access procedure on the SpCell and cancel all pending SRs.

***3> else:

****4> consider the SR transmission as a de-prioritized SR transmission.

For the side link communication, The HARQ-based sidelink RLF detection procedure is used to detect sidelink RLF based on a number of consecutive DTX on PSFCH reception occasions for a PC5-RRC connection.

RRC configures the following parameter to control HARQ-based sidelink RLF detection:

sl-maxNumConsecutiveDTX.

The following UE variable is used for HARQ-based sidelink RLF detection.

numConsecutiveDTX, which is maintained for each PC5-RRC connection.

The sidelink HARQ entity may (re-)initialize numConsecutiveDTX to zero for each PC5-RRC connection which has been established by upper layers, if any, upon establishment of the PC5-RRC connection or (re)configuration of sl-maxNumConsecutiveDTX.

The sidelink HARQ entity may for each PSFCH reception occasion associated to the PSSCH transmission:

*1> if PSFCH reception is absent on the PSFCH reception occasion:

**2> increment numConsecutiveDTX by 1;

**2> if numConsecutiveDTX reaches sl-maxNumConsecutiveDTX:

***3> indicate HARQ-based sidelink RLF detection to RRC.

*1> else:

**2> re-initialize numConsecutiveDTX to zero.

4. Later at some point in time, UE's active UL. BWP of serving cell on carrier f1 is changed to another UL BWP with SCS X2 (different from SCS of active sidelink BWP on carrier f1). This active UL BWP change can be triggered by the expiry of BWP inactivity timer, if configured. This active UL BWP change can be triggered by the reception of DCI indicating BWP change. This active UL BWP change can be triggered by reception of RRCReconfiguration message including firstActiveUplinkBWP-Id which indicates an UL BWP different from the currently active UL BWP.

5. As the SCS of active UL BWP on a cell of frequency f1 is different from SCS of active sidelink BWP on same carrier f1, sidelink BWP is deactivated. In one embodiment of this disclosure, it is provided that a UE performs the following upon SL BWP deactivation:

* not transmit SL-BCH on the BWP, if configured;
* not transmit PSCCH on the BWP;
* not transmit SL-SCH on the BWP;
* not receive PSFCH on the BWP, if configured.
* not receive SL-BCH on the BWP, if configured;
* not receive PSCCH on the BWP;
* not receive SL-SCC on the BWP;
* not transmit PSFCH on the BWP, if configured;
* suspend any configured sidelink grant of configured grant Type 1;
* clear any configured sidelink grant of configured grant Type 2,
* not transmit S-PSS and S-SSS on the BWP;
* transmit CST-RS on the BWP, if configured;
* not receive S-PSS and S-SSS on the BWP;
* not receive CSI-RS on the BWP if configured;
* Alt 1:

** flush the soft buffers for all sidelink HARQ processes;

** consider all sidelink processes as unoccupied (sets the NDIs for all HARQ process IDs to the value 0 for monitoring PDCCH in sidelink resource allocation mode 1);

** cancel, if any, triggered sidelink scheduling request procedure (i.e., cancel all pending scheduling request triggered due to sidelink BSR or sidelink CSI RS reporting and stop respective SR prohibit, timer);

** cancel, if any, triggered sidelinkbuffer status reporting procedure;

** cancel, if any, triggered sidelink CSI reporting procedure (and stop the respective sl-CSI-ReportTimer); In an alternate embodiment, instead of cancelling the triggered sidelink CSI reporting procedure, sidelink CST reporting is suspended until the sidelink BWP is activated again, sl-CSI-ReportTimer can continue to run while the sidelink BWP is deactivated, upon activation of sidelink BWP, if sl-CSI-ReportTimer is still running, a UE can resume the suspended sidelink CSI reporting):

** Stop or suspend (if running) all sidelink timers;

** reset the numConsecutiveDTX associated with each PC5-RRC connection;

** initialize SBj for each logical channel associated to each PC5-RRC connection to zero:

** Suspend all sidelink DRB(s) and/or sidelink Mts.

* Alt 2:

** If there is no other active sidelink BWP:

*** flush the soft buffers for all sidelink HARQ processes;

*** consider all sidelink processes as unoccupied (sets the NDIs for all HARQ process IDs to the value 0 for monitoring PDCCH in sidelink resource allocation mode 1);

*** cancel, if any, triggered sidelink scheduling request procedure (i.e., cancel all pending scheduling request triggered due to sidelink BSR or sidelink CSI RS reporting and stop respective SR prohibit timer);

*** cancel, if any, triggered sidelink buffer status reporting procedure;

*** cancel, if any, triggered sidelink CSI reporting procedure (and stop the respective sl-CSI-ReportTimer); In an alternate embodiment, instead of cancelling the triggered sidelink CSI reporting procedure, sidelink CSI reporting is suspended until the sidelink BWP is activated again, sl-CSI-ReportTimer can continue to run while the sidelink BWP is deactivated, upon activation of sidelink BWP, if sl-CSI-ReportTimer is still running, a UE can resume the suspended sidelink CSI reporting);

*** Stop or suspend (if running) all sidelink timers;

*** reset the numConsecutiveDTX associated with each PC5-RRC connection;

*** initialize SBj for each logical channel associated to each PC5-RRC connection to zero; and

*** Suspend all sidelink DRB(s) and/or sidelink LCHs.

6. Later at some point in time, UE's active UL BWP of serving cell on carrier f1 is changed to another UL BWP with SCS X1 (same SCS as the SCS of sidelink BWP on carrier f1). This active UL BWP change can be triggered by the expiry of BWP inactivity tinier, if configured. This active UL BWP change can be triggered by the reception of DCI indicating BWP change. This active UL BWP change can be triggered by reception of RRCReconfiguration message including firstActiveUplinkBWP-Id which indicates an UL BWP different from the currently active UL BWP.

7. As the SCS of active UL BWP on a cell of frequency f1 is same as SCS of configured sidelink BWP on same carrier f1, sidelink BWP is activated and operation as in step 3 is performed. A UE triggers a regular BSR upon activating the deactivated sidelink BWP if SL data is available for transmission in the RLC entity or in the PDCP entity. A UE resumes all suspended sidelink DRB(s) and/or sidelink LCHs.

Figure 2:
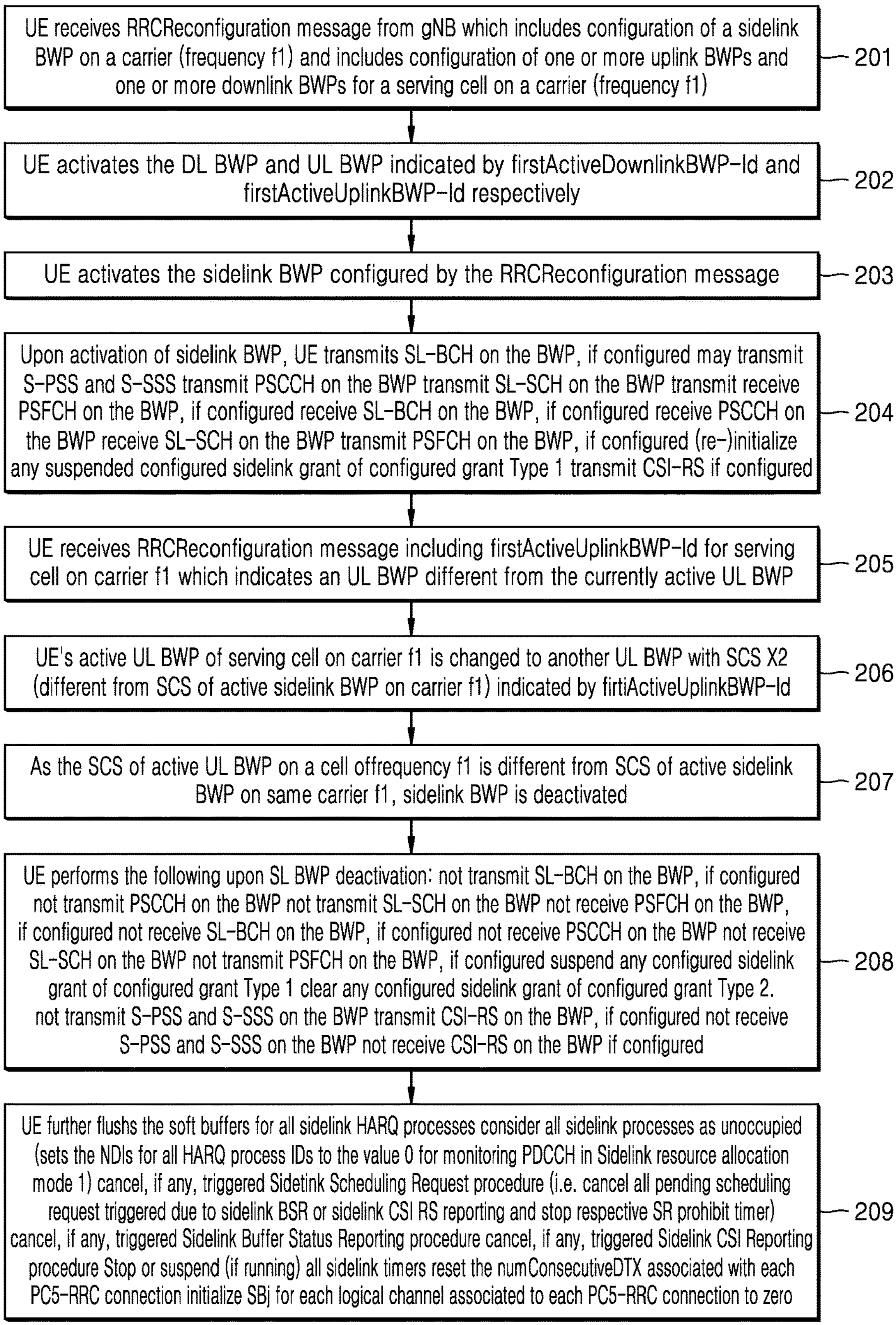
FIG. 2 illustrates an example of UE operation according to some embodiments of the present disclosure.

FIG. 2 illustrates an example of UE operation according to some embodiments of the present disclosure.

In operation 201, a UE receives RRCReconfiguration message from a gNB which includes configuration of a sidelink BWP on a carrier (frequency f1) and includes configuration of one or more uplink BWPs and one or more downlink BWPs for a serving cell on a carrier (frequency f1).

In operation 202, the UE activates the DL BWP and UL BWP indicated by firstActiveDownlinkBWP-Id and firstActiveUplinkBWP-Id, respectively.

In operation 203, the UE activates the sidelink BWP configured by the RRC message.

In operation 204, upon activation of sidelink BWP, the UE transmits SL-BCH on the BWP, if configured; may transmit S-PSS and S-SSS; transmit PSCCH on the BWP; transmit SL-SCH on the BWP; transmit receive PSFCH on the BWP, if configured; receive SL-BCH on the BWP, if configured; receive PSCCH on the BWP; receive SL-SCH on the BWP; transmit PSFCH on the BWP, if configured; (re-)initialize any suspended configured sidelink grant of configured grant Type 1; transmit CSI-RS if configured.

In operation 205, the UE receives RRCReconfiguration message including firstActiveUplinkBWP-Id for serving cell on carrier f1 which indicates an UL BWP different from the currently active UL BWP.

In operation 206, UE's active UL BWP of serving cell on carrier f1 is changed to another UL BWP with SCS X2 (different from SCS of active sidelink BWP on carrier f1) indicated by firstActiveUplinkBWP-Id.

In operation 207, as the SCS of active UL BWP on a cell of frequency f1 is different from SCS of active sidelink BWP on same carrier f1, sidelink BWP is deactivated.

In operation 208, the UE performs the following upon SL BWP deactivation: not transmit SL-BCH on the BWP, if configured; not transmit PSCCH on the BWP; not transmit SL-SCH on the BWP; not receive PSFCH on the BWP, if configured; not receive SL-BCH on the BWP, if configured; not receive PSCCH on the BWP; not receive SL-SCH on the BWP; not transmit PSFCH on the BWP, if configured; suspend any configured sidelink grant of configured grant Type 1; clear any configured sidelink grant of configured grant Type 2. Not transmit S-PSS and S-SSS on the BWP; transmit CSI-RS on the BWP, if configured; not receive S-PSS and S-SSS on the BWP; not receive CSI-RS on the BWP if configured.

In operation 209, the UE further flushes the soft buffers for all sidelink HARQ processes; consider all sidelink processes as unoccupied (sets the NDIs for all HARQ process IDs to the value 0 for monitoring PDCCH in sidelink resource allocation mode 1); cancel, if any, triggered sidelink scheduling request procedure (i.e., cancel all pending scheduling request triggered due to sidelink BSR or sidelink CSI RS reporting and stop respective SR prohibit timer); cancel, if any, triggered sidelink buffer status reporting procedure; cancel, if any, triggered sidelink CSI reporting procedure; Stop or suspend (if running) all sidelink timers; reset the numConsecutiveDTX associated with each PC5-RRC connection; initialize SBj for each logical channel associated to each PC5-RRC connection to zero.

Embodiment 2

1. A UE receives RRCReconfiguration message from a gNB. The RRCReconfiguration message includes configuration of a sidelink BWP for sidelink communication on a carrier (frequency f1). The subcarrier spacing of sidelink BWP is X1. X1 can be one of kHz15, kHz30, kHz60, kHz120, kHz240. In an alternate embodiment, X1 can be other other subcarrier spacing such as kHz480, kHz960, etc. The RRCReconfiguration message also includes configuration of one or more uplink BWPs and one or more downlink BWPs for a serving cell on a carrier (frequency f1). The configuration of serving cell also includes firstActiveUplinkBWP-Id and firstActiveDownlinkBWP-Id. In an embodiment, a serving cell can be PCell. In an alternate embodiment, a serving cell can be SpCell. In an alternate embodiment, serving cell can be SCell.

2. Upon receiving the RRCReconfiguration message, for a serving cell on frequency f1, the UE activates the DL BWP and UL BWP indicated by firstActiveDownlinkBWP-Id and firstActiveUplinkBWP-Id, respectively. The subcarrier spacing of active UL BWP is also X1. The UE also activates the sidelink BWP configured by the RRCReconfiguration message.

3. Upon activation of sidelink BWP, the UE transmits SL-BCH on the BWP, if configured; may transmit S-PSS and S-SSS, if configured; transmit PSCCH on the BWP; transmit SL-SCH on the BWP; transmit receive PSFCH on the BWP, if configured; receive SL-BCH on the BWP, if configured; receive PSCCH on the BWP; receive SL-SCH on the BWP; transmit PSFCH on the BWP, if configured; (re-)initialize any suspended configured sidelink grant of configured grant Type 1; transmit CSI-RS, if configured; receive CSI-RS, if configured; may receive S-PSS and S-SSS, if configured.

A UE performs sidelink communication operations (SBj maintenance, a scheduling request procedure, a sidelink BSR reporting procedure, a sidelink CSI reporting procedure, a HARQ based RLF procedure, etc.) as described in embodiment 1.

4. Later at some point in time, UE's active UL BWP of serving cell on carrier f1 is changed to another UL BWP with SCS X2 (different from SCS of sidelink BWP on carrier f1). This active UL BWP change can be triggered by the expiry of BWP inactivity timer, if configured. This active UL BWP change can be triggered by the reception of DCI indicating BWP change. This active UL MVP change can be triggered by reception of RRCReconfiguration message including firstActiveUplinkBWP-Id which indicates an UL BWP different from the currently active UL BWP.

5. As the SCS of active UL BWP on a cell of frequency f1 is different from SCS of active sidelink BWP on same carrier f1, sidelink BWP is deactivated. In one embodiment of this disclosure, it is provided that the UE performs the following upon SL BWP deactivation:

* not transmit SL-BCH on the BWP, if configured;
* not transmit PSCCH on the BWP;
* not transmit SL-SCH on the BWP;
* not receive PSFCH on the BWP, if configured.
* not receive SL-BCH on the BWP, if configured;
* not receive PSCCH on the BWP;
* not receive SL-SCH on the BWP;
* not transmit PSFCH on the BWP, if configured;
* suspend any configured sidelink grant of configured grant Type 1;
* clear any configured sidelink grant of configured grant Type 2.
* not transmit S-PSS and S-SSS on the BWP;
* transmit CSI-RS on the BWP if configured;
* not receive S-PSS and S-SSS on the BWP;
* not receive CST-RS on the BWP if configured; and
* Alt 1:
** If SL BWP is not activated before a defined time period (reactivation waiting tinier is started upon deactivation and upon expiry of this timer), the UE performs the following:
*** flush the soft buffers for all sidelink HARQ processes;
*** consider all sidelink processes as unoccupied (sets the NDIs for all HARQ process IDs to the value 0 for monitoring PDCCH in sidelink resource allocation mode 1);
*** cancel, if any, triggered sidelink scheduling request procedure (i.e., cancel all pending scheduling request triggered due to sidelink BSR or sidelink CSI RS reporting and stop respective SR prohibit timer);
*** cancel, if any, triggered sidelink buffer status reporting procedure;
*** cancel, if any, triggered sidelink CST reporting procedure (and stop the respective sl-CSI-ReportTimer); In an alternate embodiment, instead of cancelling the triggered sidelink CSI reporting procedure, sidelink CSI reporting is suspended until the sidelink BWP is activated again, sl-CSI-ReportTimer can continue to run while the sidelink BWP is deactivated, upon activation of sidelink BWP, if sl-CSI-ReportTimer is still running, the UE can resume the suspended sidelink CSI reporting);
*** Stop or suspend (if running) all sidelink timers (except reactivation waiting timer);
*** reset the numConsecutiveDTX associated with each PC5-RRC connection;
*** initialize SBj for each logical channel associated to each PC5-RRC connection to zero;
*** reactivation waiting timer is stopped upon activation of sidelink BWP;
*** The value of reactivation waiting tinier can be configured by gNB (in RRCReconfiguration message or system information); and
*** Suspend all sidelink DRB(s) and/or sidelink LCHs:
* Alt 2:
** If there is no other active sidelink BWP;
*** If a sidelink BWP is not activated before a defined time period (reactivation waiting timer is started upon deactivation and upon expiry of this timer), the UE performs the following:
**** flush the soft buffers for all sidelink HARQ processes;
**** consider all sidelink processes as unoccupied (sets the NDIs for all HARQ process IDs to the value 0 for monitoring PDCCH in sidelink resource allocation mode 1);
*** cancel, if any, triggered sidelink scheduling request procedure (i.e., cancel all pending scheduling request triggered due to sidelink BSR or sidelink CSI RS reporting and stop respective SR prohibit timer);
**** cancel, if any, triggered sidelink buffer status reporting procedure;
**** cancel, if any, triggered sidelink CSI reporting procedure (and stop the respective sl-CSI-ReportTimer); In an alternate embodiment, instead of cancelling the triggered sidelink CSI reporting procedure, sidelink CSI reporting is suspended until the sidelink BWP is activated again, sl-CSI-ReportTimer can continue to run while the sidelink BWP is deactivated, upon activation of sidelink BWP, if sl-CSI-ReportTimer is still running, the UE can resume the suspended sidelink CSI reporting);
**** Stop or suspend (if running) all sidelink timers (except reactivation waiting timer);
**** reset the numConsecutiveDTX associated with each PC5-RRC connection;
**** initialize SBj for each logical channel associated to each PC5-RRC, connection to Zero;
**** reactivation waiting timer is stopped upon activation of a sidelink BWP;
**** The value of reactivation waiting timer can be configured by gNB (in RRCReconfiguration message or system information); and
**** Suspend all sidelink DRB(s) and/or sidelink LCHs.

6. Later at some point in time, UE's active UL. BWP of serving cell on carrier f1 is changed to another UL BWP with SCS X1 (same SCS as the SCS of sidelink BWP on carrier f1). This active UL BWP change can be triggered by the expiry of BWP inactivity timer, if configured. This active UL BWP change can be triggered by the reception of DCI indicating BWP change. This active UL BWP change can be triggered by reception of RRCReconfiguration message including firstActiveUplinkBWP-Id which indicates an UL BWP different from the currently active UL BWP.

7. As the SCS of active UL BWP on a cell of frequency f1 is same as SCS of configured sidelink BWP on same carrier f1, sidelink BWP is activated and operation as in step 3 is performed. The UE triggers a regular BSR upon activating the deactivated sidelink BWP if SL data is available for transmission in the RLC entity or in the PDCP entity. The UE resumes all suspended sidelink DRB(s) and/or sidelink LCHs.

Figure 3:
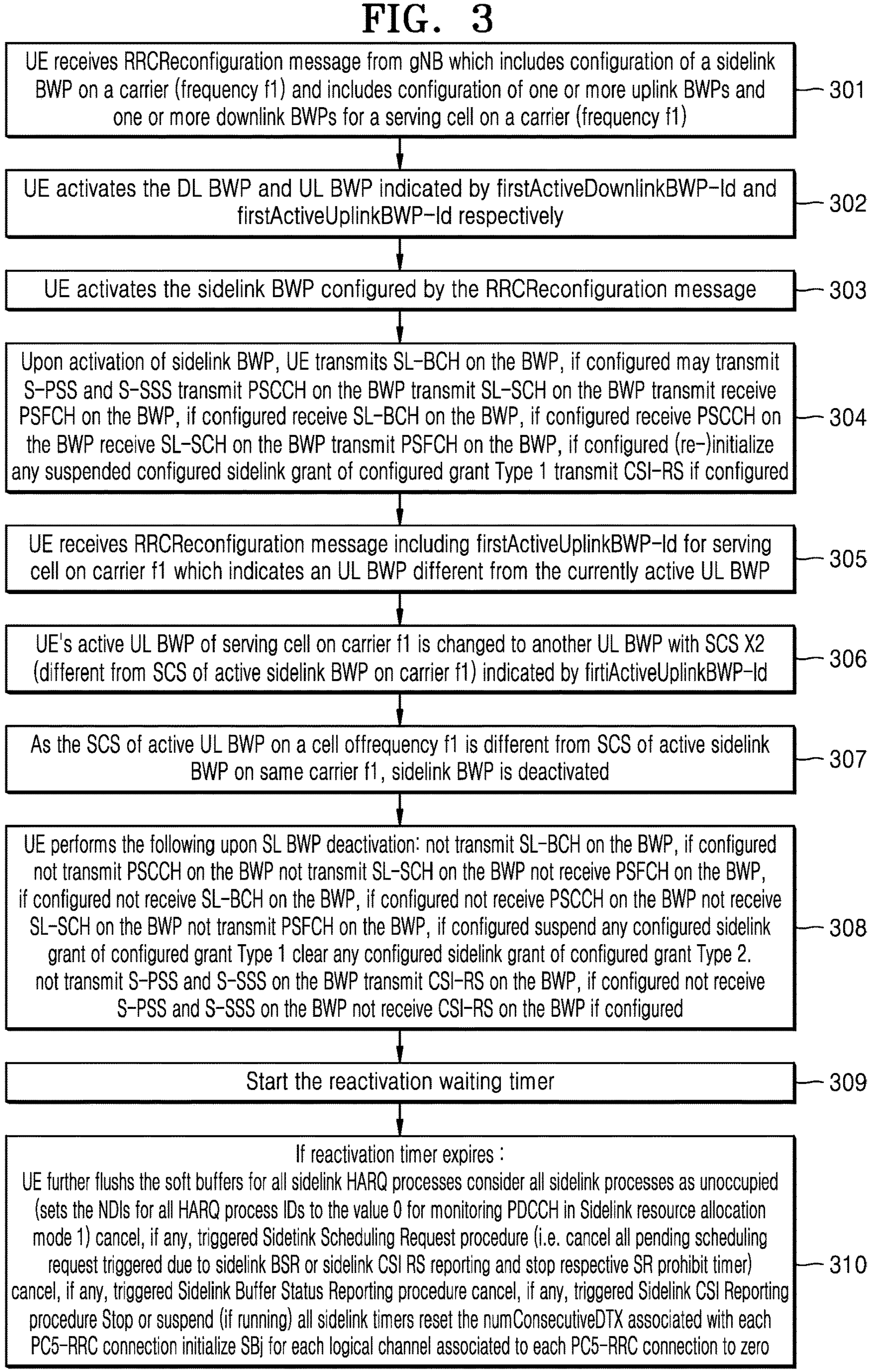
FIG. 3 illustrates an example of UE operation according to some embodiments of the present disclosure.

FIG. 3 illustrates an example of UE operation according to some embodiments of the present disclosure.

In operation 301, the UE receives RRCReconfiguration message from a gNB which includes configuration of a sidelink BWP on a carrier (frequency f1) and includes configuration of one or more uplink BWPs and one or more downlink MVPs for a serving cell on a carrier (frequency f1).

In operation 302, the UE activates the DL BWP and UL BWP indicated by firstActiveDownlinkBWP-Id and firstActiveUplinkBWP-Id, respectively.

In operation 303, the UE activates the sidelink BWP configured by the RRCReconfiguration message.

In operation 304, upon activation of sidelink BWP, the UE transmits SL-BCH on the BWP, if configured; may transmit S-PSS and S-SSS; transmit PSCCH on the BWP; transmit SL-SCH on the BWP; transmit receive PSFCH on the BWP, if configured; receive SL-BCH on the BWP, if configured; receive PSCCH on the BWP; receive SL-SCH on the BWP; transmit PSFCH on the BWP, if configured; (re-)initialize any suspended configured sidelink grant of configured grant Type 1; transmit CSI-RS if configured.

In operation 305, the HE receive RRCReconfiguration message including firstActiveUplinkBWP-Id for serving cell on carrier f1 which indicates an UL BWP different from the currently active UL BWP.

In operation 306, UE's active UL BWP of serving cell on carrier f1 is changed to another UL BWP with SCS X2 (different from SCS of active sidelink BWP on carrier f1) indicated by firstActiveUplinkBWP-Id.

In operation 307, as the SCS of active UL BWP on a cell of frequency f1 is different from SCS of active sidelink BWP on same carrier f1, sidelink BWP is deactivated.

In operation 308, the HE performs the following upon SL BWP deactivation: not transmit SL-BCH on the BWP, if configured; not transmit PSCCH on the BWP; not transmit SL-SCH on the BWP; not receive PSFCH on the BWP, if configured; not receive SL-BCH on the BWP, if configured; not receive PSCCH on the BWP; not receive SL-SCH on the BWP; not transmit PSFCH on the BWP, if configured; suspend any configured sidelink grant of configured grant Type 1; clear any configured sidelink grant of configured grant Type 2. not transmit S-PSS and S-SSS on the BWP; transmit CSI-RS on the BWP, if configured; not receive S-PSS and S-SSS on the BWP; not receive CSI-RS on the BWP if configured;

In operation 309, start the reactivation waiting timer.

In operation 310, if reactivation timer expires: the UE further flushes the soft buffers for all sidelink HARQ processes; consider all sidelink processes as unoccupied (sets the NDIs for all HARQ process IDs to the value 0 for monitoring PDCCH in sidelink resource allocation mode 1); cancel, if any, triggered sidelink scheduling request procedure (i.e., cancel all pending scheduling request triggered due to sidelink BSR or sidelink CSI RS reporting and stop respective SR prohibit timer); cancel, if any, triggered sidelink buffer status reporting procedure; cancel, if any, triggered sidelink CSI reporting procedure; stop or suspend (if running) all sidelink timers; reset the numConsecutiveDTX associated with each PC5-RRC connection; initialize SBj for each logical channel associated to each PC5-RRC connection to zero.

Embodiment 3

1. A UE receives RRCReconfiguration message from a gNB. The RRCReconfiguration message includes configuration of a sidelink BWP for sidelink communication on a carrier (frequency f1). The subcarrier spacing of sidelink BWP is X1. X1 can be one of kHz15, kHz30, kHz60, kHz120, kHz240. In an alternate embodiment, X1 can be other other subcarrier spacing such as kHz480, kHz960, etc. The RRCReconfiguration message also includes configuration of one or more uplink BWPs and one or more downlink BWPs for a serving cell on a carrier (frequency f1). The configuration of serving cell also includes firstActiveUplinkBWP-Id and firstActiveDownlinkBWP-Id. In an embodiment, a serving cell can be PCell. In an alternate embodiment, a serving cell can be SpCell. In an alternate embodiment, a serving cell can be SCell.

2. Upon receiving the RRCReconfiguration message, for a serving cell on frequency f1, the UE activates the DL BWP and UL BWP indicated by firstActiveDownlinkBWP-Id and firstActiveUplinkBWP-id, respectively. The subcarrier spacing of active UL BWP is also X1. A UE also activates the sidelink BWP configured by the RRCReconfiguration message.

3. Upon activation of sidelink BWP, the UE transmits SL-BCH on the BWP, if configured; may transmit S-PSS and S-SSS, if configured; transmit PSCCH on the BWP; transmit SL-SCH on the BWP; transmit receive PSFCH on the BWP, if configured; receive SL-BCH on the BWP, if configured; receive PSCCH on the BWP; receive SL-SCH on the BWP; transmit PSFCH on the BWP, if configured; (re-)initialize any suspended configured sidelink grant of configured grant Type 1; transmit CSI-RS, if configured; receive CSI-RS, if configured; may receive S-PSS and S-SSS, if configured.

A UE performs sidelink communication operations (SBj maintenance, a scheduling request procedure, a sidelink BSR reporting procedure, a sidelink CSI reporting procedure, a HARQ based RLF procedure, etc.) as described in embodiment 1.

4. Later at some point in time, UE's active UL BWP of serving cell on carrier f1 is changed to another UL BWP with SCS X2 (different from SCS of sidelink BWP on carrier f1). This active UL BWP change can be triggered by the expiry of BWP inactivity timer, if configured. This active UL BWP change can be triggered by the reception of DCI indicating BWP change. This active UL BWP change can be triggered by reception of RRCReconfiguration message including firstActiveUplinkBWP-Id which indicates an UL BWP different from the currently active UL BWP.

5. As the SCS of active UL BWP on a cell of frequency f1 is different from SCS of active sidelink BWP on same carrier f1, sidelink BWP is deactivated. In one embodiment of this disclosure, it is provided that the UE performs the following upon SL BWP deactivation:

* not transmit SL-BCH on the BWP, if configured;
* not transmit PSCCH on the BWP;
* not transmit SL-SCH on the BWP;
* not receive PSFCH on the BWP, if configured.
* not receive SL-BCH on the BWP, if configured;
* not receive PSCCH on the BWP;
* not receive SL-SCH on the BWP;
* not transmit PSFCH on the BWP, if configured;
* suspend any configured sidelink grant of configured grant Type 1;
* clear any configured sidelink grant of configured grant Type 2.
* not transmit S-PSS and S-SSS on the BWP;
* transmit CSI-RS on the BWP if configured;
* not receive S-PSS and S-SSS on the BWP;
* not receive CSI-RS on the BWP if configured; and
* Alt 1:
** cancel, if any, triggered sidelink scheduling request procedure (i.e., cancel all pending scheduling request triggered due to sidelink BSR or sidelink CSI RS reporting and stop respective SR prohibit timer);
** cancel, if any, triggered sidelink buffer status reporting procedure;
** cancel, if any, triggered sidelink CSI reporting procedure (and stop the respective sl-CSI-ReportTimer); In an alternate embodiment, instead of cancelling the triggered sidelink CSI reporting procedure, sidelink CSI reporting is suspended until the sidelink BWP is activated again, sl-CSI-ReportTimer can continue to run while the sidelink BWP is deactivated, upon activation of sidelink BWP, if sl-CSI-ReportTimer is still running, the UE can resume the suspended sidelink CSI reporting);
** Stop or suspend (if running) all sidelink timers (except reactivation waiting timer);
** reset the numConsecutiveDTX associated with each PC5-RRC connection;
** Suspend all sidelink DRB(s) and/or sidelink LCHs; and
* Alt 2:
** If there is no other active sidelink BWP:
*** cancel, if any, triggered sidelink scheduling request procedure (i.e., cancel all pending scheduling request triggered due to sidelink BSR or sidelink CSI RS reporting and stop respective SR prohibit timer);
*** cancel, if any, triggered sidelink buffer status reporting procedure;
*** cancel, if any, triggered sidelink CSI reporting procedure (and stop the respective sl-CSI-ReportTimer); In an alternate embodiment, instead of cancelling the triggered sidelink CSI reporting procedure, sidelink CSI reporting is suspended until the sidelink BWP is activated again, sl-CSI-ReportTimer can continue to run while the sidelink BWP is deactivated, upon activation of sidelink BWP, if sl-CSI-ReportTimer is still running, the UE can resume the suspended sidelink CSI reporting);
*** Stop or suspend (if running) all sidelink timers;
*** reset the numConsecutiveDTX associated with each PC5-RRC, connection; and
*** Suspend all sidelink DRB(s) and/or sidelink LCHs.

6. Later at some point in time, UE's active UL. BWP of serving cell on carrier f1 is changed to another UL BWP with SCS X1 (same SCS as the SCS of sidelink BWP on carrier f1). This active UL BWP change can be triggered by the expiry of BWP inactivity timer, if configured. This active UL BWP change can be triggered by the reception of DCI indicating BWP change. This active UL BWP change can be triggered by reception of RRCReconfiguration message including firstActiveUplinkBWP-Id which indicates an UL BWP different from the currently active UL BWP.

7. As the SCS of active UL BWP on a cell of frequency f1 is same as SCS of configured sidelink BWP on same carrier f1, sidelink BWP is activated and operation as in step 3 is performed. A UE triggers a regular BSR upon activating the deactivated sidelink BWP if SL data is available for transmission in the RLC entity or in the PDCP entity. The UE resumes all sidelink DRB(s) and/or sidelink LCHs.

FIG. 4 illustrates an example of UE operation according to some embodiments of the present disclosure.

In operation 401, the UE receives RRCReconfiguration message from a gNB which includes configuration of a sidelink BWP on a carrier (frequency f1) and includes configuration of one or more uplink BWPs and one or more downlink BWPs for a serving cell on a carrier (frequency f1).

In operation 402, the UE activates the DL BWP and UL BWP indicated by firstActiveDownlinkBWP-Id and firstActiveUplinkBWP-Id, respectively.

In operation 403, the UE activates the sidelink BWP configured by the RRCReconfiguration message.

In operation 404, upon activation of sidelink BWP, the UE transmits SL-BCH on the BWP, if configured; may transmit S-PSS and S-SSS; transmit PSCCH on the BWP; transmit SL-SCH on the BWP; transmit receive PSFCH on the BWP, if configured; receive SL-BCH on the BWP, if configured; receive PSCCH on the BWP; receive SL-SCH on the BWP; transmit PSFCH on the BWP, if configured; (re-)initialize any suspended configured sidelink grant of configured grant Type 1; transmit CSI-RS if configured.

In operation 405, the UE receives RRCReconfiguration message including firstActiveUplinkBWP-Id for serving cell on carrier f1 which indicates an UL BWP different from the currently active UL BWP.

In operation 406, UE's active UL BWP of serving cell on carrier f1 is changed to another UL BWP with SCS X2 (different from SCS of active sidelink BWP on carrier f1) indicated by firstActiveUplinkBWP-Id.

In operation 407, as the SCS of active UL BWP on a cell of frequency f1 is different from SCS of active sidelink BWP on same carrier f1, sidelink BWP is deactivated.

In operation 408, the HE performs the following upon SL BWP deactivation: not transmit SL-BCH on the BWP, if configured; not transmit PSCCH on the BWP; not transmit SL-SCH on the BWP; not receive PSFCH on the BWP, if configured; not receive SL-BCH on the BWP, if configured; not receive PSCCH on the BWP; not receive SL-SCH on the BWP; not transmit PSFCH on the BWP, if configured; suspend any configured sidelink grant of configured grant Type 1; clear any configured sidelink grant of configured grant Type 2. not transmit S-PSS and S-SSS on the BWP; transmit CSI-RS on the BWP, if configured; not receive S-PSS and S-SSS on the BWP; not receive CSI-RS on the BWP if configured;

In operation 409, the UE further cancels, if any, triggered sidelink scheduling request procedure (i.e., cancel all pending scheduling request triggered due to sidelink BSR or sidelink CSI RS reporting and stop respective SR prohibit timer); cancel, if any, triggered sidelink buffer status reporting procedure; cancel, if any, triggered sidelink CSI reporting procedure; stop or suspend (if running) all sidelink timers; reset the numConsecutiveDTX associated with each PC5-RRC connection.

Embodiment 4

1. A LTE receives RRCReconfiguration message from a gNB. The RRCReconfiguration message includes configuration of a sidelink BWP for sidelink communication on a carrier (frequency f1). The subcarrier spacing of sidelink BWP is X1. X1 can be one of kHz15, kHz30, kHz60, kHz120, kHz240. In an alternate embodiment, X1 can be other other subcarrier spacing such as kHz480, kHz960, etc. The RRCReconfiguration message also includes configuration of one or more uplink BWPs and one or more downlink BWPs for a serving cell on a carrier (frequency f1). The configuration of the serving cell also includes firstActiveUplinkBWP-Id and firstActiveDownlinkBWP-Id. In an embodiment, a serving cell can be PCell. In an alternate embodiment, a serving cell can be SpCell. In an alternate embodiment, serving cell can be SCell.

2. Upon receiving the RRCReconfiguration message, for a serving cell on frequency f1, the UE activates the DL BWP and UL BWP indicated by firstActiveDownlinkBWP-Id and firstActiveUplinkBWP-Id, respectively. The subcarrier spacing of active UL BWP is also X1. A UE also activates the sidelink BWP configured by the RRCReconfiguration message.

3. Upon activation of sidelink BWP, the UE transmits SL-BCH on the BWP, if configured; may transmit S-PSS and S-SSS, if configured; transmit PSCCH on the BWP; transmit SL-SCH on the BWP; transmit receive PSFCH on the BWP, if configured; receive SL-BCH on the BWP, if configured; receive PSCCH on the BWP; receive SL-SCH on the BWP; transmit PSCCH on the BWP, if configured; (re-)initialize any suspended configured sidelink grant of configured grant Type 1; transmit CSI-RS, if configured; receive CSI-RS, if configured; may receive S-PSS and S-SSS, if configured.

A UE perform sidelink communication operations (SBj maintenance, a scheduling request procedure, a sidelink BSR reporting procedure, a sidelink CSI reporting procedure, HARQ based RLF procedure, etc.) as described in embodiment 1.

4. Later at some point in time, UE's active UL BWP of serving cell on carrier f1 is changed to another UL BWP with SCS X2 (different from SCS of sidelink BWP on carrier f1). This active UL BWP change can be triggered by the expiry of BWP inactivity timer, if configured. This active UL BWP change can be triggered by the reception of DCI indicating BWP change. This active UL BWP change can be triggered by reception of RRCReconfiguration message including firstActiveUplinkBWP-Id which indicates an UL BWP different from the currently active UL BWP.

5. As the SCS of active UL BWP on a cell of frequency f1 is different from SCS of active sidelink BWP on same carrier f1, sidelink BWP is deactivated. In one embodiment of this disclosure, it is provided that the UE performs the following upon SL BWP deactivation:

* not transmit SL-BCH on the BWP, if configured;
* not transmit PSCCH on the BWP;
* not transmit SL-SCH on the BWP;
* not receive PSFCH on the BWP, if configured.
* not receive SL-BCH on the BWP, if configured;
* not receive PSCCH on the BWP;
* not receive SL-SCH on the BWP;
* not transmit PSFCH on the BWP, if configured;
* suspend any configured sidelink grant of configured grant Type 1;
* clear any configured sidelink grant of configured grant Type 2.
* not transmit S-PSS and S-SSS on the BWP;
* transmit CSI-RS on the BWP if configured;
* not receive S-PSS and S-SSS on the BWP;
* not receive CSI-RS on the BWP if configured; and

* Alt 1:
** If SL BWP is not activated before a defined time period (reactivation waiting timer is started upon deactivation and upon expiry of this timer), the UE performs the following:
*** cancel, if any, triggered sidelink scheduling request procedure i.e., cancel all pending scheduling request triggered due to sidelink BSR or sidelink CSI RS reporting and stop respective SR prohibit timer);
*** cancel, if any, triggered sidelink buffer status reporting procedure;
*** cancel, if any, triggered sidelink CSI reporting procedure (and stop the respective sl-CSI-ReportTimer); In an alternate embodiment, instead of cancelling the triggered sidelink CSI reporting procedure, sidelink CSI reporting is suspended until the sidelink BWP is activated again, sl-CSI-ReportTimer can continue to run while the sidelink BWP is deactivated, upon activation of sidelink BWP, if sl-CSI-ReportTimer is still running, the UE can resume the suspended sidelink CSI reporting);
*** Stop or suspend (if running) all sidelink timers (except reactivation waiting timer);
*** reset the numConsecutiveDTX associated with each PC5-RRC connection;
*** reactivation waiting timer is stopped upon activation of sidelink BWP;
*** The value of reactivation waiting timer can be configured by gNB (in RRCReconfiguration message or system information); and
*** Suspend all sidelink DRB(s) and/or sidelink LCHs; and
* Alt 2:
** If there is no other active sidelink BWP:
*** If a sidelink BWP is not activated before a defined time period (reactivation waiting timer is started upon deactivation and upon expiry of this timer), the performs the following:
*** cancel, if any, triggered sidelink scheduling request procedure (i.e., cancel all pending scheduling request triggered due to sidelink BSR or sidelink CSI RS reporting and stop respective SR prohibit timer);
**** cancel, if any, triggered sidelink buffer status reporting procedure;
**** cancel, if any, triggered sidelink CSI reporting procedure (and stop the respective sl-CSI-ReportTimer); In an alternate embodiment, instead of cancelling the triggered sidelink CSI reporting procedure, a sidelink CSI reporting is suspended until the sidelink BWP is activated again, sl-CSI-ReportTimer can continue to run while the sidelink BWP is deactivated, upon activation of sidelink BWP, if sl-CSI-ReportTimer is still running, the UE can resume the suspended sidelink CSI reporting);
**** Stop or suspend (if running) all sidelink timers (except reactivation waiting timer);
**** reset the numConsecutiveDTX associated with each PC5-RRC, connection;
**** reactivation waiting timer is stopped upon activation of a sidelink BWP;
**** The value of reactivation waiting timer can be configured by gNB (in RRCReconfiguration message or system information); and
**** Suspend all sidelink DRB(s) and/or sidelink LCHs.

6. Later at some point in time, UE's active UL BWP of serving cell on carrier f1 is changed to another UL BWP with SCS X1 (same SCS as the SCS of sidelink BWP on carrier f1). This active UL BWP change can be triggered by the expiry of BWP inactivity timer, if configured. This active UL BWP change can be triggered by the reception of DCI indicating BWP change. This active UL BWP change can be triggered by reception of RRCReconfiguration message including firstActiveUplinkBWP-Id which indicates an UL BWP different from the currently active UL BWP.

7. As the SCS of active UL BWP on a cell of frequency f1 is same as SCS of configured sidelink BWP on same carrier f1, sidelink BWP is activated and operation as in step 3 is performed. The UE triggers a regular BSR upon activating the deactivated sidelink BWP if SL data is available for transmission in the RLC entity or in the PDCP entity. The UE resumes all sidelink DRB(s) and/or sidelink LCHs.

Figure 5:
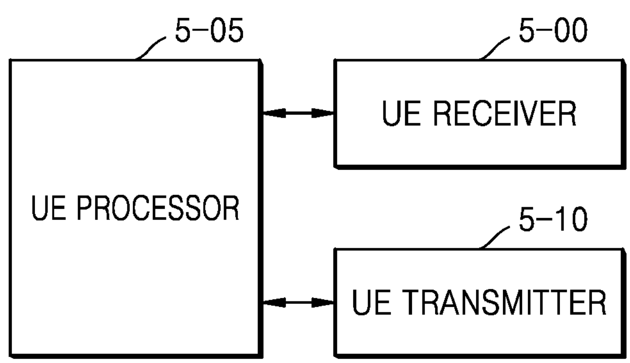
FIG. 5 illustrates a structure of a UE according to some embodiments of the disclosure.

FIG. 5 illustrates a structure of a LYE according to some embodiments of the disclosure.

Referring to FIG. 5, the UE may include a UE receiver 5-00, a UE transmitter 5-10, and a UE processor 5-05. The UE receiver 5-00 and the UE transmitter 5-10 may be collectively called the transceiver. According to the aforementioned communication method performed by the UE, the UE receiver 5-00, the UE transmitter 5-10, and the UE processor 5-05 of the UE may operate. However, elements of the UE are not limited thereto. For example, the UE may include more elements (e.g., a memory) than the aforementioned elements or may include fewer elements than the aforementioned elements. Also, the UE receiver 5-00, the UE transmitter 5-10, and the UE processor 5-05 may be integrated to one chip.

The UE receiver 5-00 and the UE transmitter 5-10 (or the transceiver) may transmit and receive a signal with a BS. The signal may include control information and data. To this end, the transceiver may include a radio frequency (RF) transmitter for up-converting a frequency of and amplifying a signal to be transmitted, and an RF receiver for low-noise amplifying and down-converting a frequency of a received signal. However, the RF transmitter and the RF receiver are merely examples and the elements of the transceiver are not limited thereto.

The transceiver may receive a signal through a radio channel and output the signal to the UE processor 5-05, and may transmit a signal output from the UE processor 5-05, through a radio channel.

A memory (not shown) may store programs and data that are required for operations of the UE. The memory may also store control information or data included in a signal obtained by the UE. The memory may be implemented as a storage medium including a read only memory (ROM), a random access memory (RAM), a hard disk, a compact disc (CD)-ROM, a digital versatile disc (DVD), or the like, or any combination thereof.

The UE processor 5-05 may control a series of procedures to operate the UE according to the afore-described embodiments of the disclosure. The UE processor 5-05 may be implemented as a controller or one or more processors.

Figure 6:
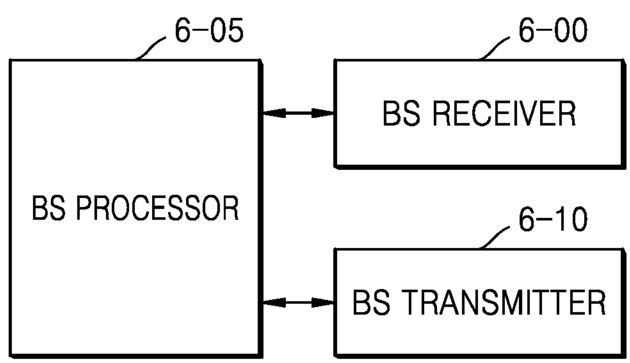
FIG. 6 illustrates a structure of a BS according to some embodiments of the disclosure.

FIG. 6 illustrates a structure of a BS according to some embodiments of the disclosure.

Referring to FIG. 6, the BS may include a BS receiver 6-00, a BS transmitter 6-10, and a BS processor 6-05. The BS receiver 6-00 and the BS transmitter 6-10 may be collectively called the transceiver. According to the aforementioned communication method performed by the BS, the BS receiver 6-00, the BS transmitter 6-10, and the BS processor 6-05 of the BS may operate. However, elements of the BS are not limited thereto. For example, the BS may include more elements (e.g., a memory) than the aforementioned elements or may include fewer elements than the aforementioned elements. Also, the BS receiver 6-00, the BS transmitter 6-10, and the BS processor 6-05 may be integrated to one chip.

The BS receiver 6-00 and the BS transmitter 6-10 (or the transceiver) may transmit and receive a signal with a UE. The signal may include control information and data. To this end, the transceiver may include a RF transmitter for up-converting a frequency of and amplifying a signal to be transmitted, and an RF receiver for low-noise amplifying and down-converting a frequency of a received signal. However, the RF transmitter and the RF receiver are merely examples and the elements of the transceiver are not limited thereto.

The transceiver may receive a signal through a radio channel and output the signal to the BS processor 6-05, and may transmit a signal output from the BS processor 6-05, through a radio channel.

A memory (not shown) may store programs and data that are required for operations of the BS. The memory may also store control information or data included in a signal obtained by the BS. The memory may be implemented as a storage medium including a ROM, a RAM, a hard disk, a CD-ROM, a DVD, or the like, or any combination thereof.

The BS processor 6-05 may control a series of procedures to operate the BS according to the afore-described embodiments of the disclosure. The BS processor 6-05 may be implemented as a controller or one or more processors.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a terminal in a wireless communication system, the method comprising:
- changing an active uplink (UL) bandwidth part (BWP) in a carrier of a cell from a first UL BWP to a second UL BWP;
- identifying whether a subcarrier spacing of the second UL BWP is different from a subcarrier spacing of a sidelink (SL) BWP in the carrier of the cell,
- in case that the subcarrier spacing of the second UL BWP is different from the subcarrier spacing of the SL BWP in the carrier of the cell, deactivating the SL BWP; and
- based on the deactivation of the SL BWP:
  - canceling a triggered SL scheduling request procedure, a triggered SL buffer status reporting procedure, and a triggered SL channel status information (CSI) reporting procedure, and
  - determining not to receive a SL primary synchronization signal (S-PSS) and a SL secondary synchronization signal (S-SSS) on the SL BWP.

2. The method of claim 1, wherein the active UL BWP is changed from the first UL BWP to the second UL BWP based on an expiry of a BWP inactivity timer.

3. The method of claim 1, wherein the active UL BWP is changed from the first UL BWP to the second UL BWP based on a downlink control information (DCI) indicating a BWP change.

4. The method of claim 1, wherein the active UL BWP is changed from the first UL BWP to the second UL BWP based on a radio resource control (RRC) reconfiguration message including information indicating the second UL BWP.

5. A terminal in a wireless communication system, the terminal comprising:

at least one transceiver;

at least one processor communicatively coupled to the at least one transceiver; and at least one memory, communicatively coupled to the at least one processor, storing instructions executable by the at least one processor individually or in any combination to cause the terminal to:

change an active uplink (UL) bandwidth part (BWP) in a carrier of a cell, from a first UL BWP to a second UL BWP, identify whether a subcarrier spacing of the second UL BWP is different from a subcarrier spacing of a sidelink (SL) BWP in the carrier of the cell, in case that the subcarrier of the second UL BWP is different from the subcarrier spacing of the SL BWP in the carrier of the cell, deactivate the SL BWP, and based on the deactivation of the BWP:

cancel a triggered SL scheduling request procedure, a triggered SL buffer status reporting procedure, and a triggered SL channel status information (CSI) reporting procedure, and determine not to receive a SL primary synchronization signal (S-PSS) and a SL secondary synchronization signal (S-SSS) on the SL BWP.

6. The terminal of claim 5, wherein the active UL BWP is changed from the first UL BWP to the second UL BWP based on an expiry of a BWP inactivity timer.

7. The terminal of claim 5, wherein the active UL BWP is changed from the first UL BWP to the second UL BWP based on a downlink control information (DCI) indicating a BWP change.

8. The terminal of claim 5, wherein the active UL BWP is changed from the first UL BWP to the second UL BWP based on a radio resource control (RRC) reconfiguration message including information indicating the second UL BWP.

* * * * *